US012681443B2

(12) United States Patent
Ambhore et al.

(10) Patent No.: US 12,681,443 B2
(45) Date of Patent: Jul. 14, 2026

(54) PROCESS OPTIMIZATION USING INTEGRATED DIGITAL TWINS

(71) Applicant: Accenture Global Solutions Limited, Dublin (IE)

(72) Inventors: Dnyaneshwar Laxmanrao Ambhore, Pune (IN); Saumya Shekhar, Mumbai (IN); Suraj G Jadhav, Mumbai (IN); Ashwin Ramachandran, Coimbatore (IN); Ankur Dayal, Bangalore (IN); Hemant Kumar Bansal, Bharatpur (IN); Ritdhwara Jain, Gurugram (IN); Vineet Dubey, New Delhi (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 585 days.

(21) Appl. No.: 18/125,808

(22) Filed: Mar. 24, 2023

(65) Prior Publication Data

US 2024/0319687 A1 Sep. 26, 2024

(51) Int. Cl.
*G05B 13/04* (2006.01)
*G05B 13/02* (2006.01)

(52) U.S. Cl.
CPC ....... *G05B 13/042* (2013.01); *G05B 13/0265* (2013.01)

(58) Field of Classification Search
CPC . G05B 13/0265; G05B 13/042; G06Q 10/067
See application file for complete search history.

(56) References Cited

U.S. PATENT DOCUMENTS

| | | | | |
|---|---|---|---|---|
| 2020/0192307 A1* | 6/2020 | Wee | ......................... | G06N 20/00 |
| 2020/0201314 A1* | 6/2020 | Franke | ............... | G06Q 30/0206 |
| 2022/0171907 A1* | 6/2022 | Chang | .................... | G06N 3/047 |
| 2022/0326680 A1 | 10/2022 | Sakata et al. | | |
| 2023/0195066 A1* | 6/2023 | Ramanasankaran ... | | G05B 15/02 |
| | | | | 700/28 |

(Continued)

OTHER PUBLICATIONS

Bellalouna et al., "Case study for design optimization using the digital twin approach," Procedia CIRP, Mar. 2021, 100:595-600.

(Continued)

*Primary Examiner* — Tameem D Siddiquee
(74) *Attorney, Agent, or Firm* — Mannava & Kang, P.C.

(57) ABSTRACT

Implementations for receiving an integrated digital twin including multiple digital twins, each digital twin including a computer-executable model of a real-world system used to execute a portion of a process, within the integrated digital twin, a first digital twin providing output to generate input to a second digital twin, receiving enterprise data, the enterprise data being provided from a set of real-world systems used to execute the process, executing, by the integrated digital twin module, simulations of the process using the integrated digital twin and one or more agent-based models based on the enterprise data, at least one agent-based model providing input to the first digital twin, determining simulation results from the simulations, the simulation results including a value of at least one objective function, and adjusting one or more parameters of at least one real-world system used to execute the process based on the simulation results.

14 Claims, 6 Drawing Sheets

(56) References Cited

U.S. PATENT DOCUMENTS

2023/0376877 A1* 11/2023 Barat ................. G06Q 10/0635

OTHER PUBLICATIONS

Lee et al., "Digital Twin-Based Analysis and Optimization for Design and Planning of Production Lines," Machines, Dec. 1, 2022, 10(12):1147, 18 pages.

Microsoft, "The Process Digital Twin: A step towards operational excellence," Microsoft, Dec. 2017, 13 pages.

Christina Latsou, "Digital Twin Integration in Multi-Agent Cyber Physical Manufacturing Systems", vol. 54, Issue 1, 2021, pp. 811-816, ELSEVIER, https://doi.org/10.1016/j.ifacol.2021.08.096.

Intellectual Property India, "First Examination Report for Indian Application No. 202414001549", dated Feb. 9, 2026, 11 pages.

\* cited by examiner

*600*

Receive integrated digital twin — *602*

Receive enterprise data — *604*

Execute simulation(s) — *606*

Determine simulation results — *608*

Adjust real-world system(s) — *610*

PROCESS OPTIMIZATION USING INTEGRATED DIGITAL TWINS

BACKGROUND

Enterprises continuously seek to improve and gain efficiencies in their operations to achieve goals (e.g., revenue growth, improve working capital cycles, decrease margins, improve profitability). To this end, enterprises employ internal systems and interact with one or more external systems to support execution of operations. For example, enterprises can use enterprise resource planning (ERP) systems, customer relationship management (CRM) systems, human capital management (HCM) systems, and the like. As another example, one or more systems of an enterprise can interact with customer systems and/or third-party systems (e.g., financial institutions, vendors, suppliers). Each system can generate and maintain data that may be relevant to operations of an enterprise. In seeking improvements to enterprise operations, data of respective systems can be analyzed for decision making.

SUMMARY

Implementations of the present disclosure are generally directed to a process optimization platform for optimizing enterprise processes. More particularly, implementations of the present disclosure are directed to a process optimization platform that leverages integrated digital twins representative of processes to provide visualization and prediction of impacts of one or more scenarios across enterprise processes. In some implementations, a digital twin is provided for each sub-process of a process, and multiple digital twins are integrated to provide the integrated digital twin representative of the process as a whole. In some examples, the integrated digital twin is connected to multiple, disparate, technical systems for real-time or near real-time ingestion of data to provide visualizations and/or predictions.

In some implementations, actions include receiving, by an integrated digital twin module, an integrated digital twin including multiple digital twins, each digital twin including a computer-executable model of a real-world system used to execute a portion of a process, within the integrated digital twin, a first digital twin providing output that is used to generate input to a second digital twin, receiving enterprise data from an enterprise data layer, the enterprise data being provided from a set of real-world systems used to execute the process, executing, by the integrated digital twin module, one or more simulations of the process using the integrated digital twin and one or more agent-based models based on the enterprise data, at least one agent-based model providing input to the first digital twin, determining simulation results from the one or more simulations, the simulation results including a value of at least one objective function, and adjusting one or more parameters of at least one real-world system used to execute the process based on the simulation results. Other implementations of this aspect include corresponding systems, apparatus, and computer programs, configured to perform the actions of the methods, encoded on computer storage devices.

These and other implementations can each optionally include one or more of the following features: actions further include processing at least a portion of real-world data through a signal enhancer to determine a set of patterns, each digital twin being provided based on at least one pattern in the set of patterns, the real-world data representative of historical executions of the process; each digital twin is provided based on concepts recorded in a knowledge graph representative of relationships between the concepts in a context of the process; each agent-based model includes attribute data and behavior data, the attribute data comprising statistical data determined from historical data, the behavior data being determined using a set of machine learning (ML) models; the at least one objective function includes a set of variables, a set of constraints, and a set of weights; weights in the set of weights are determined using one or more ML models; and adjusting one or more parameters of at least one real-world system includes changing a parameter value of the at least one real-world system from a first value to a second value, the second value being provided in the simulation results.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, for example, apparatus and methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description, drawings, and claims.

BRIEF DESCRIPTION OF DRAWINGS

Like reference numbers and designations in the various drawings indicate like elements.

DETAILED DESCRIPTION

Figure 1:
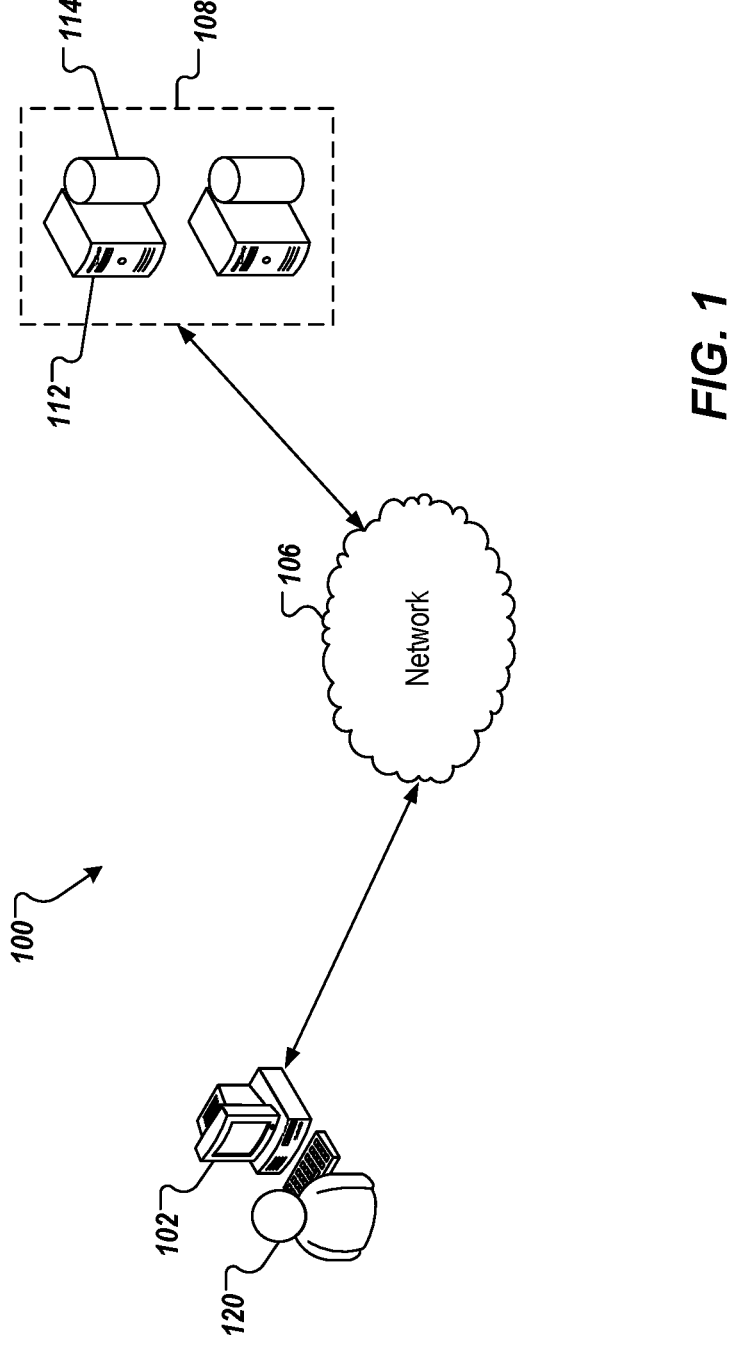
FIG. 1 depicts an example system that can execute implementations of the present disclosure.

Implementations of the present disclosure are generally directed to a process optimization platform for optimizing enterprise processes. More particularly, implementations of the present disclosure are directed to a process optimization platform that leverages integrated digital twins representative of processes to provide visualization and prediction of impacts of one or more scenarios across enterprise processes. In some implementations, a digital twin is provided for each sub-process of a process, and multiple digital twins are integrated to provide the integrated digital twin representative of the process as a whole. In some examples, the integrated digital twin is connected to multiple, disparate, technical systems for real-time or near real-time ingestion of data to provide visualizations and/or predictions.

In some implementations, actions include receiving, by an integrated digital twin module, an integrated digital twin including multiple digital twins, each digital twin including a computer-executable model of a real-world system used to execute a portion of a process, within the integrated digital twin, a first digital twin providing output that is used to generate input to a second digital twin, receiving enterprise data from an enterprise data layer, the enterprise data being provided from a set of real-world systems used to execute the process, executing, by the integrated digital twin module, one or more simulations of the process using the integrated digital twin and one or more agent-based models based on the enterprise data, at least one agent-based model providing input to the first digital twin, determining simulation results from the one or more simulations, the simulation results including a value of at least one objective function, and adjusting one or more parameters of at least one real-world system used to execute the process based on the simulation results.

To provide further context, and as introduced above, enterprises continuously seek to improve and gain efficiencies in their operations to achieve goals (e.g., revenue growth, improve working capital cycles, decrease margins, improve profitability). To this end, enterprises employ internal systems and interact with one or more external systems to support execution of operations. For example, enterprises can use enterprise resource planning (ERP) systems, customer relationship management (CRM) systems, human capital management (HCM) systems, and the like. As another example, one or more systems of an enterprise can interact with customer systems and/or third-party systems (e.g., financial institutions, vendors, suppliers). Each system can generate and maintain data that may be relevant to operations of an enterprise.

In seeking improvements to enterprise operations, data of respective systems can be analyzed. However, the data is provided from these disparate, technical systems. As such, the data is heterogeneous, can lack in data quality (e.g., data based on human intelligence), can be of relatively low value (e.g., in cases of raw data), and can include noise, inconsistencies, and conflicts. Consequently, traditional systems face technical problems in ingestion of data and providing useful, actionable data. Further, in analyzing data, traditional systems are unable to identify cascading impact across multifunctional processes and systems and captured information flow is strictly linear and unidirectional. In some traditional systems, decisions are based only on enterprise data without other influencing signals. Another issue is that fragmented data sets only enable a relatively limited enterprise level view on enterprise operations. Also, traditional systems are unable to identify cascading impact across multifunctional processes and systems. Further, dashboards and reports of some traditional systems represent a point-in-time of enterprise operations, and are absent the ability to learn and optimize forward looking recommendations for improving enterprise operations.

In view of the foregoing, and as introduced above, implementations of the present disclosure are directed to a process optimization platform that leverages integrated digital twins representative of processes to provide visualization and prediction of impacts of one or more scenarios across enterprise processes. As described in further detail herein, a digital twin is provided for each sub-process of a process, and multiple digital twins are integrated to provide the integrated digital twin representative of the process as a whole. In some examples, the integrated digital twin is connected to multiple, disparate, technical systems for real-time or near real-time ingestion of data to provide visualizations and/or predictions.

In general, a digital twin can be described as a virtual model of processes, products, people, places, systems, devices, services or states of any real-world entity. In the context of the present disclosure, digital twins are models of sub-processes of a process, and operate in combination to provide an integrated digital twin. A digital twin can be connected to the real object using a digital thread. The digital twin can contain historical, present, and future information and associations of the modeled entities to support inferences and insightful analytics. This pairing of the virtual and physical worlds through the digital thread enables analysis of monitored data from systems to, for example, anticipate and manage problems before they even occur; prognose systems to prevent downtime; optimize and develop opportunities; and plan future activities by using simulations and artificial intelligence (AI)-based predictive analytics, for example. Simulated investigations, also referred to herein as scenarios, can be executed using the integrated digital twin. For example, the integrated digital twin takes in data from multiple, disparate, technical systems gathered by a digital thread and process the data. In some examples, the digital thread can be described as a layer of data collection (e.g., a data ingestion layer) from real-world systems.

Implementations of the present disclosure are described in further detail herein with reference to an example process. The example process includes an order to cash (O2C) process that can include multiple sub-processes from, for example, receiving orders (e.g., for products and/or services) to reconciling payments received for provisioning products and/or services. In some examples, the O2C process can include, for example, sub-processes of sales (e.g., order management), finance (e.g., invoicing, credit management), supply chain (e.g., supply and demand planning, fulfillment), and accounting (e.g., account receivables, cash reconciliation). In the context of the present disclosure, a digital twin is provided for each sub-process, and multiple digital twins are integrated to provide an integrated digital twin representative of the O2C process.

As described in further detail herein, the O2C process involves complex interactions across sub-processes executed using multiple, disparate, technical systems. In the context of the O2C process, example systems can include, without limitation, sales operations systems (e.g., channel management, trade promotions, customer satisfaction), supply chain systems (e.g., demand planning, fulfilment), finance and accounting systems (e.g., revenue, cash flow, working capital), and controls systems (e.g., compliance, risk). In the O2C process context, enterprises look for optimizations to drive revenue growth, improve working capital cycles, create best-in-class customer experience, and the like. However, and as noted above, achievement of such optimizations can be hindered as a result of the multiple, disparate, and complex technical systems, through which tasks of processes, such as the O2C process, are executed.

In the context of the O2C process, an integrated digital twin is provided and can be described as a connected virtual replica of the O2C process. In some examples, the integrated digital twin is created by synthesizing cross-functional data, process inputs, expert knowledge, and complex interactions between systems and resources. As described in further detail herein, in the context of the O2C process, the integrated digital twin enables visualization and prediction of impacts of one or more scenarios across the enterprise, functions, and/or sub-processes.

For example, the integrated digital twin enables scenarios to be modeled based on real-time and/or near real-time data received from the multiple, disparate, technical systems. Example scenarios can include, without limitation, macroeconomic fluctuations, customer behavior changes, supply chain disruption, competitor moves, and/or transformation initiatives. In this manner, the integrated digital twin helps decision makers in areas of, and without limitation, sales (e.g., order management), finance (e.g., credit management, invoicing), supply chain (e.g., supply and demand planning, fulfillment), and accounting (e.g., receivables, cash reconciliation). As also described herein, the integrated digital twin can be used to improve downstream outcomes around revenue, working capital, and cost, for example, and to enhance operational capabilities and performance maintaining compliance on risk and controls.

In accordance with implementations of the present disclosure, the integrated digital twin can be described as a modular scalable solution that connects data and decisions through a system-level view. As such, technical hurdles in modeling processes reliant on multiple, disparate, technical systems are overcome, as well as enabling enterprises to achieve goals (e.g., unlock trapped value, improve margins).

While the O2C process is referenced herein for purposes of non-limiting illustration, it is contemplated, however, that implementations of the present disclosure can be realized for any appropriate process and are not limited to examples discussed herein.

FIG. 1 depicts an example system 100 that can execute implementations of the present disclosure. The example system 100 includes a computing device 102, a back-end system 108, and a network 106. In some examples, the network 106 includes a local area network (LAN), wide area network (WAN), the Internet, or a combination thereof, and connects web sites, devices (e.g., the computing device 102), and back-end systems (e.g., the back-end system 108). In some examples, the network 106 can be accessed over a wired and/or a wireless communications link.

In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In the depicted example, the back-end system 108 includes at least one server system 112, and data store 114. In some examples, the at least one server system 112 hosts one or more computer-implemented systems that can be used to execute one or more enterprise processes. For example, the server system 112 can host systems for training ML models of a HOI detection system in accordance with implementations of the present disclosure.

In accordance with implementations of the present disclosure, the at least one server system 112, or any other appropriate server system can host a process optimization platform. As described in further detail herein, the process optimization platform can provide integrated digital twins, each integrated digital twin being a virtual representation of a process executed by or on behalf of an enterprise, and being connected to (e.g., for data ingestion) multiple, disparate, real-world technical systems that are used to execute the process.

Figure 2:
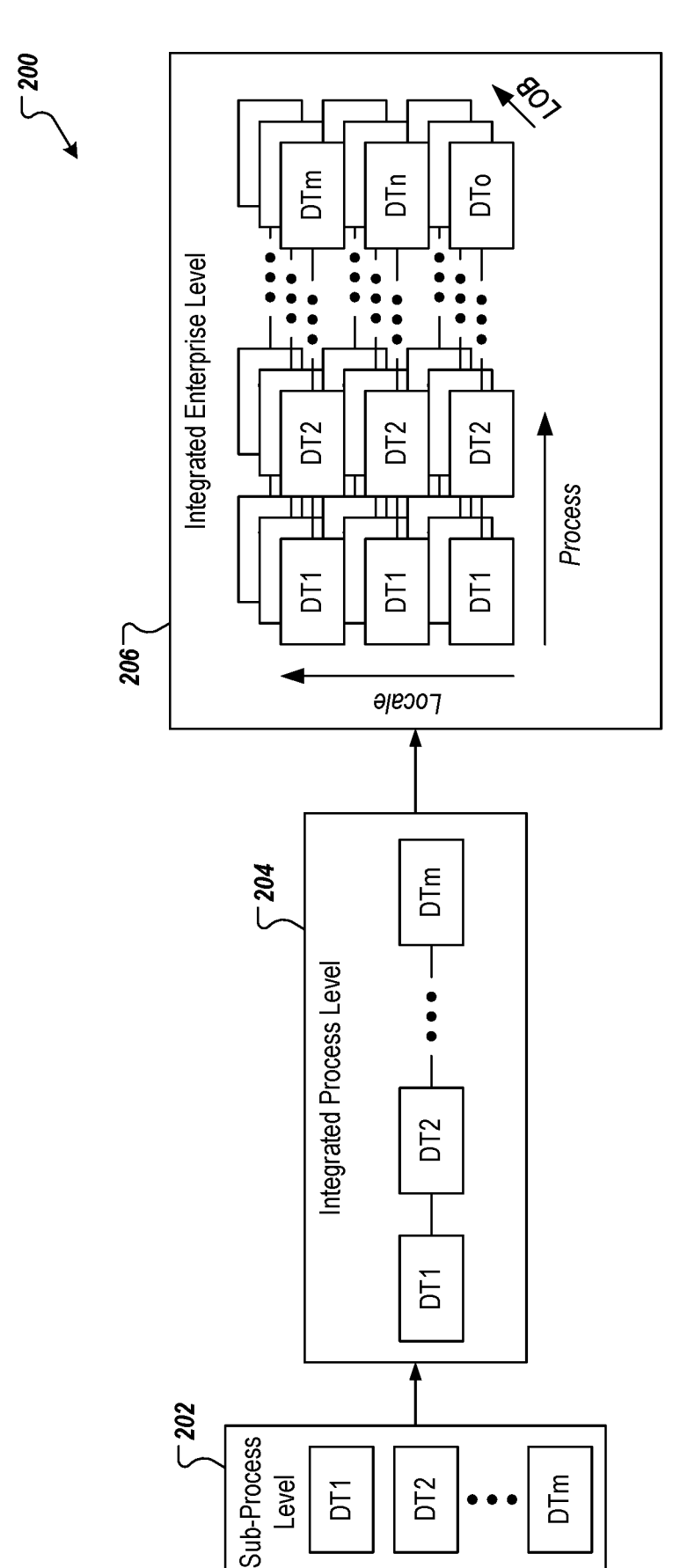
FIG. 2 depicts a conceptual representation of an integrated digital twin in accordance with implementations of the present disclosure.

FIG. 2 depicts a conceptual representation 200 of integrated digital twins in accordance with implementations of the present disclosure. The example of FIG. 2 includes a sub-process level 202, an integrated process level 204, and an integrated enterprise level 206. In some examples, the process level 202 includes digital twins (e.g., DT1, . . . , DTm) for each sub-process of a process. For example, and with non-limiting reference to the example context, the sub-process level 202 includes a sales digital twin, a finance digital twin, a supply chain digital twin, and an accounting digital twin. In some examples, the process level 202 includes an integrated digital twin that represents a process. For example, and with non-limiting reference to the example context, the integrated process level 204 includes an integrated digital twin representing the O2C process that is composed of the sales digital twin, the finance digital twin, the supply chain digital twin, and the accounting digital twin. In some examples, the integrated enterprise level 206 includes a set of integrated digital twins (of the integrated process level 204) that are aggregated across dimensions of locations (e.g., geographic locations, datacenter locations) and lines of business (LOB) of the enterprise.

In accordance with implementations of the present disclosure, the sub-process level 202, the integrated process level 204, and the integrated enterprise level 206 can be used to perform functionality in support of achieving goals of an enterprise. Example functionality can include, without limitation, providing predictions for any appropriate time-scale (e.g., day(s), week(s), month(s), year(s)), customize "what-if" scenarios for any appropriate time-scale, system(s), constraints, and/or available resources, optimize key performance indicators (KPIs) at aggregate levels, and monitor performance at the enterprise-level.

In general, a discrete digital twin is a single process that provides value without needing to be broken down further. For example, an order-to-billing (O2B) or collection process can be monitored and reported on at this entity level. A composite digital twin is a combination of discrete digital twins that represent an entity comprising multiple process. The composition may take place at different levels such as business level or locations. In associational integration, processes are associated with each other and changes in the processes directly impact the other process (e.g., O2B, collection, reconciliation). In some examples, peer-to-peer integration can model the peer-to-peer relationships between digital twins, which exist between the same or similar types of functions (e.g., O2B across pharma, healthcare and diagnostic equipment). The total effect of all of the digital twins is the sum of the effect produced by each piece of digital twin.

Figure 3:
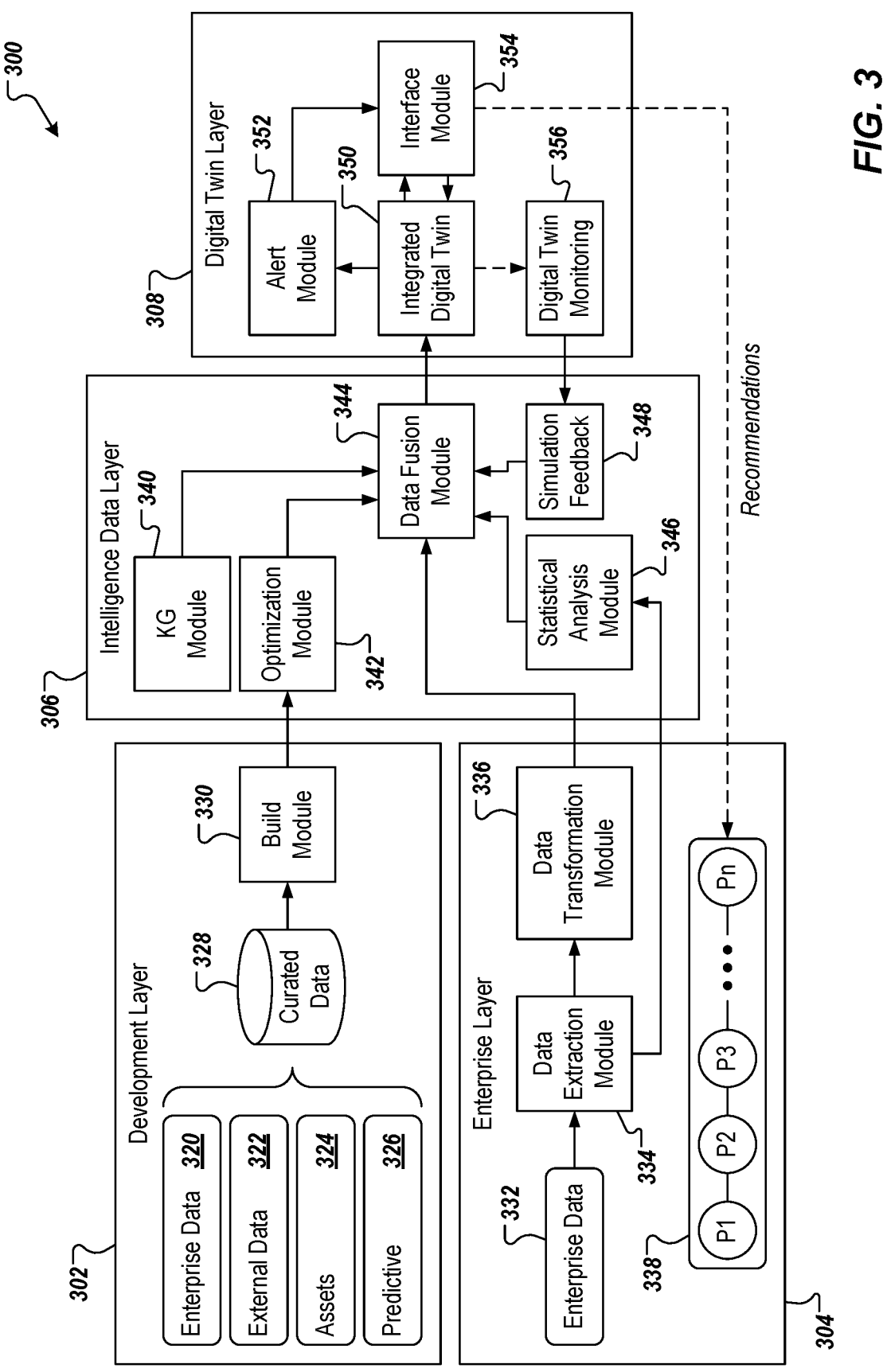
FIG. 3 depicts a conceptual architecture of a process simulation system using integrated digital twins in accordance with implementations of the present disclosure.

FIG. 3 depicts a conceptual architecture of a process simulation system 300 using integrated digital twins in accordance with implementations of the present disclosure. In some examples, the process simulation system 300 is part of the process optimization platform of the present disclosure. In the example of FIG. 3, process simulation system 300 includes a development layer 302, an enterprise layer 304, an intelligence data layer 306, and a digital twin layer 308.

In some examples, the development layer 302 includes enterprise data 320, external data 322, asset data 324, prediction data 326, a curated data store 328, and a build module 330. In some examples, the enterprise data 320, the external data 322, the asset data 324, and the prediction data 326 are stored in the curated data store 328 and can be provide to the build module 330. In some examples, the enterprise data 320 can include, without limitation, demand planning data, order data, fulfillment data, billing data, credit management data, supply chain data, and finance and accounting data. In some examples, the external data 322 can include, without limitation, inflation data, cost of borrowing data, credit ratings data, regulatory data, bankruptcy data, treasury bill data, and coupon data. In some examples, the asset data 324 represents foundational assets and subject matter expert (SME) knowledge. Example asset data 324 can include, without limitation, pathway data, cycle time data, exception management data, rework information, and AHT data. In some examples, the prediction data 326 can include, without limitation, revenue forecast data, late payment forecast data, cost and margin forecast data, and provision prediction data.

In some examples, the enterprise layer 304 includes enterprise data 332, a data extraction module 334 (e.g., the extracts enterprise data 332 from enterprise systems through, for example, an application programming interface (API)), and a data transformation module 336. In some examples, processes, represented as a process 338, are executed at the enterprise layer. For example, the process 338 can represent the O2C process introduced herein. In some examples, each process 338 includes a set of subprocesses (e.g., $P_1$, . . . , $P_n$). In some examples, the intelligence data layer 306 includes a knowledge graph (KG) module 340, an optimization module 342, a data fusion module 344, a statistical analysis module 346, and a simulation feedback module 348. In some examples, the digital twin layer 308 includes an integrated digital twin module 350, an alert module 352, an interface module 354, and a digital twin monitoring module 356.

As noted above, data, such as that described herein, comes from multiple, disparate, technical systems and, as such, is heterogenous, and can suffer from data quality issues, contain raw data having relatively low value, and can contain noise, inconsistencies, and conflicts. In view of this, implementations of the present disclosure provide a signal enhancer that pre-processes the data to improve the data and make the data more usable for the integrated digital twin of the present disclosure. For example, and in the non-limiting context of the O2C process, the signal enhancer can process the data to provide revenue patterns, payment patterns, risk patterns, cost patterns, and operational patterns. Example revenue patterns can include, without limitation, order volume patterns, order value patterns, revenue change patterns, and market share change patterns. Example payment patterns can include, without limitation, payment change patterns, days sales outstanding (DSO) change patterns, and dispute rate change patterns. Example risk patterns can include, without limitation, customer risk segment patterns, impairment risk patterns, and change in risk profile patterns. Example cost patterns can include, without limitation, cost of insurance patterns (loss allowance), capital cost patterns, and on time and in full (OTIF) fulfillment patterns. Example operational patterns can include, without limitation, order arrival rate patterns, order priority patterns, pathway probability patterns, patterns in agent statistics, and patterns in agent parameters.

In some implementations, the signal enhancer enriches data ingested by digital twins. For example, input signals to a digital twin can be broadly categorized into external data, enterprise data, foundational assets and SME knowledge, and predictive assets, each discussed in further detail herein. The signal enhancer helps build causality and correlation between changes to these signals and their impact on revenue patterns (e.g., impact on order volume, order value, revenue, market share), payment patterns (e.g., changes to days sales outstanding and dispute rates), risk patterns (e.g., customer risk segment, impairment risks, changes to risk profile), cost patterns (e.g., loss allowance/cost of insurance, cost of working capital, cost of OTIF fulfilment), and operational patterns (e.g., arrival rates, order priorities, pathway probabilities, agent parameters and statistics).

In further detail, the signal enhancer processes data from the multiple, disparate systems, which, in terms of the data, can be described as data silos. As described in further detail herein, the signal enhancer ingests and/or virtualizes the data, enriches the data, executes inference over the data, and executes analytics. In some examples, ingestion (which can include virtualization) of the data includes retrieving and unifying the data using one or more extract, transform, load (ETL) techniques. In some examples, enriching the data includes encoding metadata in a KG based on rules and logic of a data model. In some examples, one or more analytical models are stored in the KG. In some examples, inference over the data can include connecting related data based on meaning. In some examples, unique identifiers can be used to facilitate connections between data in the KG, leaving the source data unchanged. In some examples, executing analytics can include building bi-directional correlations across the data, using the KG to identify correlations determined to be significant, and reduce a number of inputs to one or more machine learning (ML) models that can be used to generate predictions relevant to the process under consideration.

With respect to the KG, in general, the KG can be described as a collection of data and related based on a schema representing entities and relationships between entities. The data can be logically described as a graph (even though also provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents an enterprise Alpha, a node B represents a customer Beta, and an edge E is associated with the relationship "is customer of," then having the edge E connect the nodes in the direction from node A to node B in the graph represents the fact that Beta is the customer of Alpha. In some examples, the KG can be enlarged with schema-related knowledge (e.g., Alpha is a concept enterprise, Beta is a concept enterprise, and "is the customer of" is a property or relationship between two entities/instances of concept enterprise). Adding schema-related information supports evaluation of reasoning results.

A KG can be represented by any of a variety of physical data structures. For example, a KG can be represented by triples that each represent two entities in order, and a relationship from the first to the second entity; for example, [alpha, beta, is the customer of], or [beta, is the customer of, alpha], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a KG can be stored as an adjacency list in which the adjacency information includes relationship information. In some examples, each distinct entity and each distinct relationship are represented with respective, unique identifiers.

The entities represented by a KG need not be tangible things or specific people. The entities can include particular people, places, things, artistic works, concepts, events, or other types of entities. For example, and in the context of the present disclosure, example entities can include, but are not limited to, processes, sub-processes, enterprises, inflation, credit, demand, orders, invoices, payments, reconciliation, lending rates, working capital, and the like. Thus, a KG can include data defining relationships between enterprises (e.g., suppliers, customers); data defining relationships between enterprises and things (e.g., a particular enterprise has a particular credit rating); data defining relationships between places and things (e.g., geographic locations of an enterprise); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing an enterprise could have a schema defining fields for information representative of the enterprise (e.g., name, headquarters, type). Such information can be represented by fields in a type-specific data structure, or by triples that look like node-relationship-node triples (e.g., [enterprise identifier, was established on, date]), or in any other convenient predefined way. In some examples, some or all of the information specified by a type schema can be represented by links to nodes in the KG, for example, [one enterprise identifier, customer of, another enterprise identifier], where the other enterprise identifier is a node in the graph.

With regard to the KG, generation of KGs is generally known and a detailed discussion is presently foregone. However, and as noted above, implementations of the present disclosure provide for embedding correlation within the KG to correlate two or more entities represented within the KG. For example, a hypothesis on correlation between two entities (node) can be established (e.g., by a domain experts) and can be modeled in the KG as an edge "suspected correlation." This can relate, for example, various properties (internal to enterprise and external) that either "influence" or "are influenced by" each other. In some examples, the correlation hypothesis can be proven (or disproven) by a correlation model.

In some examples, the correlation model can be provided as a statistical model that provides statistical analyses representative of correlation between different parameters. In some examples, statistical values can be compared to one or more threshold values to determine whether a correlation is proven. If a correlation is proven, the edge can be changed from "suspected correlation" to "actual correlation," and, if disproven, the edge can be removed.

Figure 4:
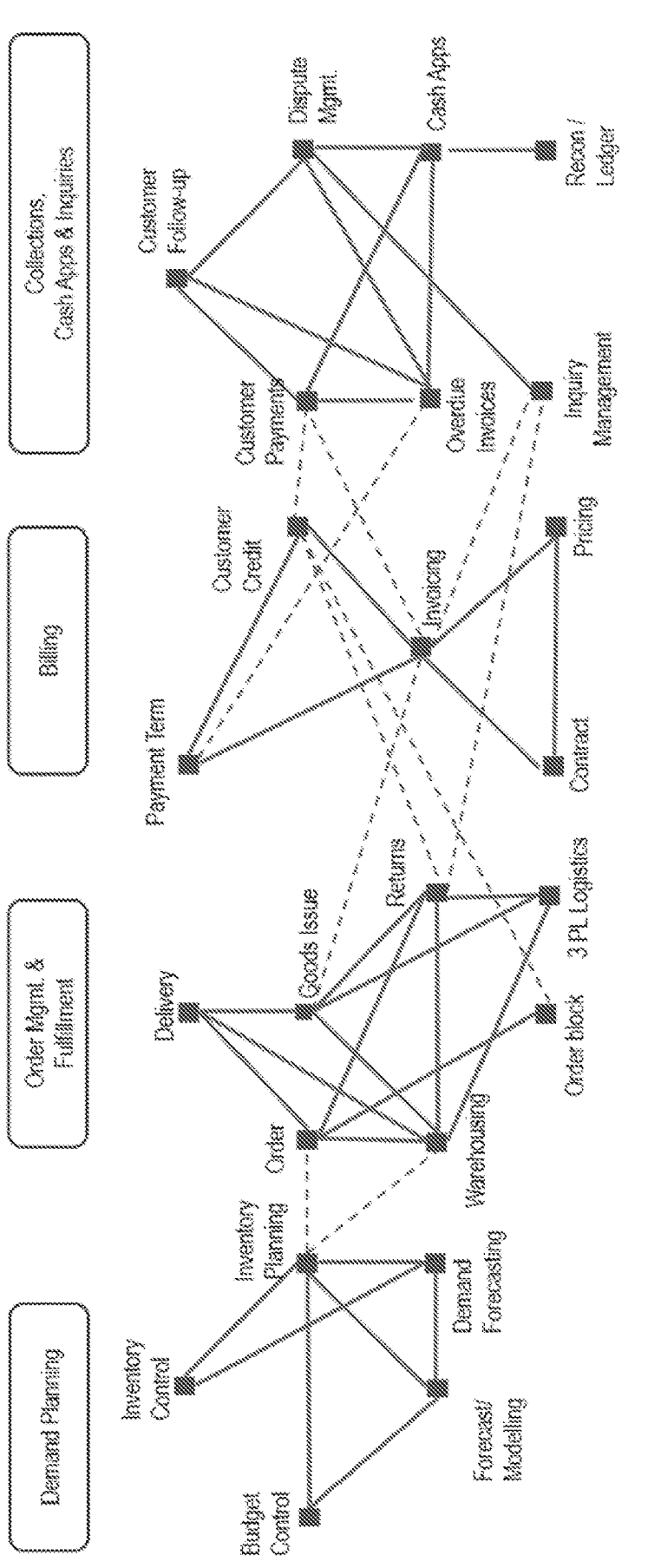
FIG. 4 depicts an example portion of an example knowledge graph in accordance with implementations of the present disclosure.

FIG. 4 depicts an example portion of an example KG in accordance with implementations of the present disclosure. More particularly, the example portion of the example KG represents the example of an O2C process, referred to herein for purposes of non-limiting illustration. In the example of FIG. 4, dashed edges can represent actual correlations determined from suspected correlations, as discussed herein.

Referring again to FIG. 3, data from the curated data store 328 and can be provided to the build module 330 for creating digital twins. In some examples, the build module 330 can also be used to generate one or more ML models for optimization, as described in further detail herein. In some examples, the build module 300 generates a digital twin using data elements stored in the curated data store 328. For example, event logs information (e.g., processing time, throughput, average handling time) is extracted, and block or activity behavior is analyzed using process mining. In some examples, information is analyzed and validated using statistical methods. This can include arrival patterns, activity time distribution, and system behavior and correlation. In some examples, ML models are built to understand process behavior which helps to mimic the actual behavior of agents in the real-world environment. For example, in an invoice collection process, customer payment behavior is learned using a customer segmentation ML model (clustering algorithm). In some examples, a ML model such as forecasting is used to predict the future behavior of the system. In some examples, ML models, such as linear regression, are built to understand the impact of quality metrics on the dispute rate in the process.

In some examples, the data fusion module 344 fuses digital twins with knowledge contained in the KG (e.g., provided by the KG module 340) to determine correlations and the like, as described herein. In some examples, the data fusion module 344 provides an integrated digital twin from multiple digital twins, which is provided to the integrated digital twin module 350 for execution of simulations, as described in further detail herein. In some examples, the data fusion module 344 can account for simulation feedback 348 from one or more simulations executed using the integrated digital twin. In some examples, statistical analytics from the statistical analytics module 346 and real-world data from the enterprise layer 304 are used in simulations executed using the integrated digital twin, as described in further detail herein.

In some implementations, and as described in further detail below, simulations are executed using the integrated digital twin. For simulations, the integrated digital twin module 350 can interact with one or more devices through the interface module 354. For example, the interface module 354 can represent client devices, APIs, and the like for communicating between users and the integrated digital twin module 350. For example, for a simulation, a user can communicate an objective functions and constraints that are to be applied during simulations executed using the integrated digital twin. In turn, the integrated digital twin module 350 can communicate results of simulations to the user (e.g., KPIs achieved by the simulation).

In some implementations, and as introduced above, one or more ML models can be used for optimization. For example, and without limitation, a ML model can be used to determine weights to be applied in optimizing the objective function. In some examples, the ML model receives historical data as input and provides a set of weights as output. Weights in the set of weights can be applied to variables in the set of variables and/or constraints in the set of constraints. In this manner, the set of weights provided by the ML model can be used to adjust influence of variables and/or constraints on the objective function during optimization thereof.

In some implementations, the process optimization platform uses an agent-based model (ABM), also referred to herein as agent, for simulating actions and interactions of autonomous agents in executing a process. In the context of the O2C process, an order agent, an invoice agent, and a payment agent can be provided among other potential agents. In some examples, each agent is provided as computer-executable code that can be executed to perform one or more functions. In some examples, each ABM includes attribute data and a behavior model. the attribute data including discrete values determined from historical data. With non-limiting reference to the O2C process, example attribute data can include account risk levels, order value, arrival patterns (volume), and the like. In some examples, the behavior model is a ML model that is extracted from existing data and is representative of behavior of an agent. With non-limiting reference to the O2C process, an example behavior model can model payment behavior of a customer (e.g., given an input, the behavior model predicts whether the customer will pay on time, or pay late).

Further, and as also discussed in further detail herein, the process optimization platform uses a discrete event simulation (DES) that models execution of a process through operation of the multiple, interconnected systems as a discrete sequence of events in time.

Figure 5:
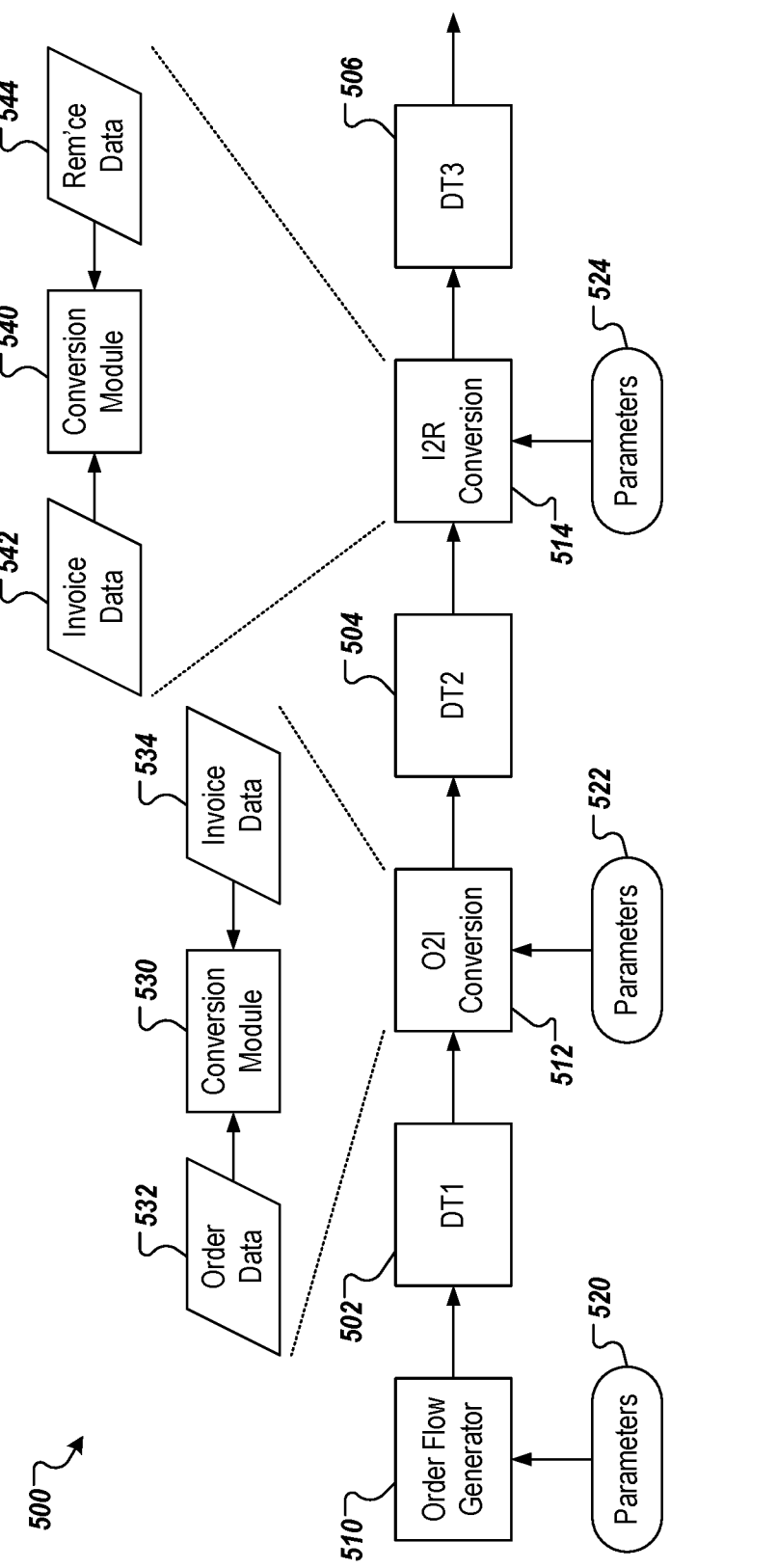
FIG. 5 depicts an example use case in accordance with implementations of the present disclosure.

FIG. 5 depicts an example use case 500 in accordance with implementations of the present disclosure. In the example use case 500, a high-level O2C process is represented and includes an integrated digital twin provided as digital twins 502, 505, 506. The O2C process represented in FIG. 5 includes order generation by an order flow generator 510, order to invoice (O2I) conversion by an O2I conversion module, and invoice to remittance (I2R) conversion represented by an I2R module 514. In some examples, the O2I conversion module 512 includes a conversion module 530 that receives order data 532 and invoice data 534. In some examples, the I2R conversion module 514 includes a conversion module 540 that receives invoice data 542 and remittance data 544.

In some examples, one or more scenarios can be evaluated within the example use case 500 using the digital twins 502, 505, 506. For example, a scenario can be used to determine how to maximize/minimize an objective function. For purposes of illustration, an example objective function can be provided as revenue per customer and one or more scenarios can be executed to maximize the revenue per customer. In the context of the O2C process, other objective functions can include, without limitation, throughput, utilization, collection efficiency, average days to payment, and the like. In some examples, the objective function includes a set of decision variables and a set of constraints having some relationship (e.g., mathematical relationship) that results in a value of the objective function for given values of variables in the set of variables. In some examples, values of variables in the set of variables can be provided from the multiple, disparate systems (e.g., in real-time, near real-time).

In some examples, the order flow generator 510 executes an order agent to generate orders. For example, the order flow generator 510 receives a set of parameters 520 and generates one or more orders based thereon. In some examples, the set of parameters can include an order arrival rate, which can be used to generate N orders per period of time (e.g., minute, hour, day, week, month). In some examples, (simulated) orders are provided to the digital twin 502, which can execute functionality of, for example, a sales order system. That is, the digital twin 502 models a real-world sales order system used by the enterprise, for which the O2C process is simulated. In some examples, the digital twin 502, as a sales order system, records the orders as received, and forwards order data to the O2I conversion module 512. For example, the digital twin simulates and/or describes event data about the behavior of the real-world process. The event data is obtained by monitoring the processes and stored in the enterprise system. This data is further mined using process mining to extract information (e.g., capture the AHT, processing time, throughput, process flow deviation, etc.).

In some examples, the O2I conversion module 512 executes an invoice generation agent to generate invoices. For example, the O2I conversion module 512 receives order data and a set of parameters 520 and generates one or more invoices based thereon. For example, the conversion module 530 determines a probability of converting an order into one or more invoices based on the order data 532 and the invoice data 534, which respectively represent historical orders and historical invoices converted for the historical orders. In some examples, an invoice value is determined using a probability function (e.g., determined by the conversion module 530) for creating invoices based on invoice parameters computed from the past data. For example, probabilities of an order being converted to a single invoice or being split over multiple invoices can be used. For example, for N orders, M invoices can be provided, where M≤N.

In some examples, conversion of an order to one or more invoices can be influenced by parameters in the set of parameters 522. Example parameters can include, without limitation, order ID, customer segment, payment terms, order value, pay term distribution, and the like. In some examples, based on the customer segment and payment behavior (e.g., early payers, late payers), the conversion probabilities are computed from the distribution function (e.g., if the invoice is fulfilled with single invoice or multiple invoices). For example, instead of converting an order to an invoice (i.e., confirming the order), the order can be blocked. This can occur, for example, if a customer has some deficiency that results in the order being blocked (e.g., non-payment of previous order(s), lack of credit).

In some examples, (simulated) invoices are provided to the digital twin 504, which can execute functionality of, for example, an order fulfillment system. That is, the digital twin 504 models a real-world order fulfillment system used by the enterprise, for which the O2C process is simulated. In some examples, the digital twin 504, as an order fulfillment system, fulfills orders, and order fulfillment data to the I2R conversion module 514. For example, the digital twin 504 simulates and/or describes event data about the behavior of the real-world process. The event data is obtained by monitoring the processes and stored in the enterprise system. This data is further mined using process mining to extract information (e.g., capture the AHT, processing time, throughput, process flow deviation).

In some examples, the I2R conversion module 514 executes an invoice conversion agent to convert invoices into remittances. For example, the I2R conversion module 514 receives order fulfillment data and a set of parameters 524 and converts one or more invoices based thereon. For example, the conversion module 540 determines a probability of converting a fulfilled order (or portion of order that has been fulfilled) into one or more remittances based on the invoice data 542 and the remittance data 544, which respectively represent historical invoices and historical remittances converted for the historical invoices. In some examples, a remittance value is determined using a probability function (e.g., determined by the conversion module 530) for converting invoices to remittances. For example, probabilities of an invoice being converted to a remittance and, if so, a single remittance or being split over multiple remittances can be provided. For example, R remittances can be provided for M invoices, where R≤M. In some examples, a remittance can be provided as a (simulated) entry in a bank statement indicating that funds for an order have been received.

In some examples, conversion of an invoice to one or more remittances can be influenced by parameters in the set of parameters 524. Example parameters can include, without limitation, order ID, customer segment, payment terms, order value, pay term distribution, and the like. In some examples, based on the customer segment and payment behavior (e.g., early payers, late payers), the conversion probabilities are computed from the distribution function (e.g., if the invoice is fulfilled with single invoice or multiple invoices).

In some examples, (simulated) remittances are provided to the digital twin 506, which can execute functionality of, for example, an accounting system. That is, the digital twin 506 models a real-world accounting system used by the enterprise, for which the O2C process is simulated. In some examples, the digital twin 506, as an accounting system, can clear invoices based on the remittances. For example, the digital twin 506 simulates and/or describes event data about the behavior of the real-world process. The event data is obtained by monitoring the processes and stored in the enterprise system. This data is further mined using process mining to extract information (e.g., capture the AHT, processing time, throughput, process flow deviation).

As represented in the example of FIG. 5, digital twins are integrated by ensuring that appropriate relationships are built between different agent forms (e.g., orders in the order management process become invoices when reaching the collection process; invoices become remittance when invoice are collected). Conversion behavior can be modelled using an agent conversion module. In some example, in the real-world process, the active entities, known as agents, get converted from one form to other (e.g., when order fulfillment is completed, a corresponding invoice is created for collection). Customers make payments against these invoices in the form of remittances. To construct this behavior in the integrated digital twin, a probabilistic distribution is created based on various attributes of the order (e.g., probability of creating x number of invoices for order y for customer with R type of risk segment). Order and invoice data is mapped to compute these probabilities at account level or customer segment level. A similar approach is used when invoices are paid (e.g., probability of creating x number of remittances for invoice x for customer with R type of risk segment).

In accordance with implementations of the present disclosure, multiple simulations can be performed over iterations using integrated digital twins to optimize an objective function. For example, for each iteration, parameters can be adjusted to determine an effect on the object function (e.g., increase, decrease). As a non-limiting, illustrative example, the use case 500 representative of the O2C process can be discussed in view of optimizing (e.g., maximizing) an object function of revenue per customer. In one simulation, a first arrival rate can be used as a parameter (e.g., in the set of parameters 520) and a first revenue can be determined (e.g., based on invoices cleared and other functionality executed by the digital twin 506 as an accounting system). In another simulation, a second arrival rate can be used as a parameter (e.g., in the set of parameters 520) and a second revenue can be determined. The first revenue and the second revenue can be compared to determine the impact that change in arrival rate has.

In some examples, data generated during the simulations can be analyzed to determined one or more other factors that can impact optimization of the objective function. For example, and with continued non-limiting reference to the O2C process, a higher arrival rate might not always result in an increase (or at least a significant increase) in revenue per customer. Here, an increase in a number of orders can have impacts such as a broader range of types of customers (e.g., customers with low credit, such that no or only partial remittance is achieved for some invoices), and/or a decrease in the number of orders fulfilled (or fulfilled on-time and/or in-full), such that revenue is lost (e.g., customer does not pay for unfulfilled order, enterprise incurs penalties of order that are not on-time and/or are only partially fulfilled).

In accordance with implementations of the present disclosure, simulations using integrated digital twins provide insights and analytics that can be applied to the real-world systems in executing processes. For example, data from systems can be received (e.g., in real-time, near real-time), one or more simulations can be performed, outcomes can be determined, and one or more changes can be made to the process and/or real-world systems used to execute the process.

For example, and in the example context of the O2C process, an affect credit changes can have on sales volume and revenue can be determined. Here, the use of automated customer credit scoring, rating and rules engine with flexible credit checks based on events will up-level processing efficiency. This includes information from external credit providers such as information bureaus that can be leveraged. This makes sure that credit blocks (earlier created through static rules) that require manual intervention are reduced to a minimum, triggering a positive downstream impact. This can include, for example, real-time order confirmation, availability checks, pick and pack, and eventually goods issue of orders. Doing so has an impact on recorded sales volume and therefore revenue within the same period.

As another example, implementations of the present disclosure can be used to achieve improvements in OTIF, as it affects invoice generation, revenue, and cash flow. For example, enterprises typically adopt a three-way match between sales order, invoices and the bill of lading on parameters of SKUs delivered, their volume and invoice value. Any mismatch triggers disputes and prevents automatic payments from being made. A digital twin enhances the ability to pre-empt such issues, and drive efficiencies in improving OTIF rates. Doing so helps generate timely and accurate invoices that are not disputed, permits timely recognition of revenues in the period goods are delivered, and helps reduce dunning efforts and follow ups for collecting on open accounts receivable Another key aspect impacting OTIF is adoption of Order Channel mix strategy. Organizations would like to understand the impact of improving channel mix which often involves customer behavior and showing the potential benefits of the change For purposes of non-limiting illustration, an example scenario will be discussed to provide an example of improving real-world execution of a process, the O2C process, using an integrated digital twin. In this example, a first customer has a total credit of 100, 70 of which are utilized, and 30 not utilized (i.e., 30 credits available), and a second customer has a total credit of 150, 60 of which are utilized, and 90 not utilized (i.e., 90 credits available). The first customer places a first order including 15 credits worth of a first stock-keeping unit (SKU) and a second order including 25 credits worth of a second SKU. Fulfilling the first order and the second order, which collectively total 40 credits, would exceed the 30 credits that the first customer has available. The second customer places a third order including 30 credits worth of the second SKU and 55 credits worth of a third SKU. Fulfilling the third order, which totals 85 credits, would fit within the 90 credits that the second customer has available.

In executing the O2C process, it need be determined whether order 1 or order 2 is fulfilled for the first customer, and/or whether order 3 is fulfilled for the second customer in full (i.e., all of SKU2 and SKU3) or in part (e.g., none of SKU2, but all of SKU3). Example solutions can include a first solution, in which, the first order is not fulfilled, the second order is fulfilled in full, and the third order is fulfilled in part (e.g., only SKU3), and a second solution, in which the first order is fulfilled, the second order is not fulfilled, and the third order is fulfilled in full. In this example, a value of an objective function can be determined through one or more simulations in an effort to maximize the value of the objective function. For example, if the objective function is to maximize revenue, it can be determined that the second solution optimizes the objective function. This also has the benefit of inventory turn.

As described herein, implementations of the present disclosure provide a simulation model that represents real-world processes. In the context of the O2C process, the simulation model represents the dynamics in the order, collection, and reconciliation, and generates the order flow volume and order value data to be inputted into the ML models. The ML models generate decision rules for prioritizing the customer accounts that require attention. When disruptions in the flows of the real-world process occur, the simulation model is updated and a new set of data is fed into the ML model to provide decision rules for setting collection policies, order fulfillment policies, and the like. The collection and order fulfillment policies are output to the real-world systems to help inform decision making. This can improve cash flow, reduce outstanding invoices, and lower bad debt expenses. Various ML models can be built to solve different business problems such as, but not limited to, a ML model for propensity to dispute that is used to detect future increase in dispute rates, a ML model for predicting invoice delinquency, a ML model to predict delayed days, and a ML model to forecast the future order demand.

In some examples, when disruptions in the flows of the physical system occur, the simulation model is updated and a new set of data is fed into the ML models to give new decision rules for setting collection and fulfillment policies, for example. Various scenarios can be designed to analyze the impact of disruptions and/or changes in the real-world process. For example, no disruption is a scenario that serves as a baseline and shows the performance of the process when the process is free from disruptions. The impact of disruption events is compared with the results obtained from a no disruption scenario. Payment disruption is a scenario, in which credit policy change impact is analyzed. Demand disruption is a scenario, in which there is an increase or decrease in demand. Customer risk profile change is a scenario, in which a change in the customer risk profile is analyzed (e.g., 2% increase in the high value high risk customers). Change in quality is a scenario, in which impact of change in quality on the dispute percentage can be analyzed. Shift in order channel strategy is a scenario, in which enterprises seek to understand the impact of improving channel mix which often involves customer behavior and showing the potential benefits of the change. Order block resolution is a scenario, in which cross-functional analytics are performed (e.g., supply chain, logistics) to reduce order blocks in the order confirmation process. Digital order entry accuracy is a scenario that addresses improving, for example, optical character recognition (OCR) accuracy and EDI yield.

Figure 6:
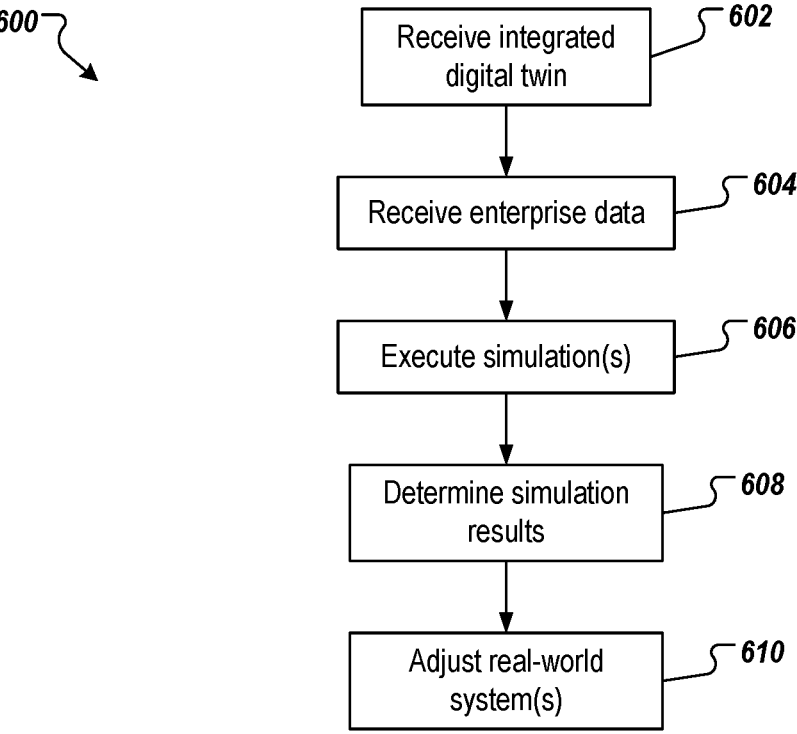
FIG. 6 depicts an example process that can be executed in accordance with implementations of the present disclosure.

FIG. 6 depicts an example process 600 that can be executed in implementations of the present disclosure. In some examples, the example process 600 is provided using one or more computer-executable programs executed by one or more computing devices.

An integrated digital twin is received (602). For example, and as described herein, an integrated digital twin module receives the integrated digital twin. In some examples, the integrated digital twin includes multiple digital twins, each digital twin including a computer-executable model of a real-world system used to execute a portion of a process. In some examples, within the integrated digital twin, a first digital twin provides input to a second digital twin. Enterprise data is received (604). For example, and as described herein, enterprise data is received from an enterprise layer (e.g., in real-time, near real-time) and is representative of real-world data that affects execution of the process. One or more simulations are executed (606). For example, and as described herein, the integrated digital twin module executes one or more simulations using the integrated digital twin and the enterprise data. In some examples, the simulations are executed using one or more agent-based models that simulate actions of agents in executing the process. Simulation results are determined (608). For example, and as described herein, simulations can be performed in an effort to optimize one or more objective functions. In some examples, values of the objective function can be determined and, for each value, parameter values of one or more of the real-world systems that achieved the values can be determined. One or more real-world systems are adjusted (610). For example, and as described herein, at least one parameter of a real-world system can be adjusted based on the simulation results to improve results of real-world execution of the process.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for optimizing processes using integrated digital twins, the method comprising:

receiving, by an integrated digital twin module, an integrated digital twin comprising multiple digital twins, each digital twin comprising a computer-executable model of a real-world system used to execute a portion of a process, within the integrated digital twin, a first digital twin providing output that is used to generate input to a second digital twin;

receiving enterprise data from an enterprise data layer, the enterprise data being provided from a set of real-world systems used to execute the process;

executing, by the integrated digital twin module, one or more simulations of the process using the integrated digital twin and one or more agent-based models based on the enterprise data, at least one agent-based model providing input to the first digital twin;

determining simulation results from the one or more simulations, the simulation results comprising a value of at least one objective function, wherein the at least one objective function comprises a set of variables, a set of constraints, and a set of weights, and wherein weights in the set of weights are determined using one or more ML models; and adjusting one or more parameters of at least one real-world system used to execute the process based on the simulation results, and wherein adjusting one or more parameters of at least one real-world system comprises changing a parameter value of the at least one real-world system from a first value to a second value, the second value being provided in the simulation results.

2. The method of claim 1, further comprising processing at least a portion of real-world data through a signal enhancer to determine a set of patterns, each digital twin being provided based on at least one pattern in the set of patterns, the real-world data representative of historical executions of the process.

3. The method of claim 1, wherein each digital twin is provided based on concepts recorded in a knowledge graph representative of relationships between the concepts in a context of the process.

4. The method of claim 1, wherein each agent-based model comprises attribute data and behavior data, the attribute data comprising statistical data determined from historical data, the behavior data being determined using a set of machine learning (ML) models.

5. A system, comprising:

one or more processors; and a computer-readable storage device coupled to the one or more processors and having instructions stored thereon which, when executed by the one or more processors, cause the one or more processors to perform operations for optimizing processes using integrated digital twins, the operations comprising:

receiving, by an integrated digital twin module, an integrated digital twin comprising multiple digital twins, each digital twin comprising a computer-executable model of a real-world system used to execute a portion of a process, within the integrated digital twin, a first digital twin providing output that is used to generate input to a second digital twin;

receiving enterprise data from an enterprise data layer, the enterprise data being provided from a set of real-world systems used to execute the process;

executing, by the integrated digital twin module, one or more simulations of the process using the integrated digital twin and one or more agent-based models based on the enterprise data, at least one agent-based model providing input to the first digital twin;

determining simulation results from the one or more simulations, the simulation results comprising a value of at least one objective function, wherein the at least one objective function comprises a set of variables, a set of constraints, and a set of weights, and wherein weights in the set of weights are determined using one or more ML models; and adjusting one or more parameters of at least one real-world system used to execute the process based on the simulation results, and wherein adjusting one or more parameters of at least one real-world system comprises changing a parameter value of the at least one real-world system from a first value to a second value, the second value being provided in the simulation results.

6. The system of claim 5, wherein operations further comprise processing at least a portion of real-world data through a signal enhancer to determine a set of patterns, each digital twin being provided based on at least one pattern in the set of patterns, the real-world data representative of historical executions of the process.

7. The system of claim 5, wherein each digital twin is provided based on concepts recorded in a knowledge graph representative of relationships between the concepts in a context of the process.

8. The system of claim 5, wherein each agent-based model comprises attribute data and behavior data, the attribute data comprising statistical data determined from historical data, the behavior data being determined using a set of machine learning (ML) models.

9. A non-transitory computer-readable storage media coupled to one or more processors and having instructions stored thereon which, when executed by the one or more processors, cause the one or more processors to perform operations for optimizing processes using integrated digital twins, the operations comprising:

receiving, by an integrated digital twin module, an integrated digital twin comprising multiple digital twins, each digital twin comprising a computer-executable model of a real-world system used to execute a portion of a process, within the integrated digital twin, a first digital twin providing output that is used to generate input to a second digital twin;

receiving enterprise data from an enterprise data layer, the enterprise data being provided from a set of real-world systems used to execute the process;

executing, by the integrated digital twin module, one or more simulations of the process using the integrated digital twin and one or more agent-based models based on the enterprise data, at least one agent-based model providing input to the first digital twin;

determining simulation results from the one or more simulations, the simulation results comprising a value of at least one objective function, wherein the at least one objective function comprises a set of variables, a set of constraints, and a set of weights, and wherein weights in the set of weights are determined using one or more ML models; and adjusting one or more parameters of at least one real-world system used to execute the process based on the simulation results, and wherein adjusting one or more parameters of at least one real-world system comprises changing a parameter value of the at least one real-world system from a first value to a second value, the second value being provided in the simulation results.

10. The computer-readable storage media of claim 9, wherein operations further comprise processing at least a portion of real-world data through a signal enhancer to determine a set of patterns, each digital twin being provided based on at least one pattern in the set of patterns, the real-world data representative of historical executions of the process.

11. The computer-readable storage media of claim 9, wherein each digital twin is provided based on concepts recorded in a knowledge graph representative of relation-ships between the concepts in a context of the process.

12. The computer-readable storage media of claim 9, wherein each agent-based model comprises attribute data and behavior data, the attribute data comprising statistical data determined from historical data, the behavior data being determined using a set of machine learning (ML) models.

13. The method of claim 1, wherein executing the one or more simulations by the integrated digital twin module comprises interaction with one or more devices through an interface module, wherein for the one or more simulations:

receiving in a user communication, the objective function and constraints that are to be applied using the inte-grated digital twin; and outputting the integrated digital twin a result of the one or more simulations to the user.

14. The system of claim 5, wherein executing the one or more simulations by the integrated digital twin module comprises interaction with one or more devices through an interface module, wherein for the one or more simulations, a user communicates the objective function and constraints that are to be applied using the integrated digital twin, and wherein the integrated digital twin communicates a result of the one or more simulations to the user.

\* \* \* \* \*